UNITED STATES PATENT OFFICE.

OTIS HUTCHINS, OF NIAGARA FALLS, NEW YORK, ASSIGNOR TO THE CARBORUNDUM COMPANY, OF NIAGARA FALLS, NEW YORK, A CORPORATION OF PENNSYLVANIA.

MANUFACTURE OF SILICON CARBID.

1,331,435.  Specification of Letters Patent.  Patented Feb. 17, 1920.

No Drawing.  Application filed July 15, 1919. Serial No. 311,033.

*To all whom it may concern:*

Be it known that I, OTIS HUTCHINS, a resident of Niagara Falls, Niagara county, New York, have invented a new and useful Improvement in the Manufacture of Silicon Carbid, of which the following is a full, clear, and exact description.

My invention relates to an improved method or process for the manufacture of silicon carbid, and is designed to provide a method of this character which will result in the production of a more nearly uniform product than has heretofore been possible.

The well known method of manufacturing silicon carbid consists in heating a mixture of coke, sand and sawdust to a high temperature in an electric furnace. This furnace may be of the type such as shown in the Acheson Patent, 560,291, dated May 19, 1896, which consists of a long rectangular box-like brick structure having permanent ends and removable sides. In carrying out the method, the furnace is filled about one-half full with a mixture of coke, sand and sawdust. A trench extending from one permanent end of the furnace to another and joining the carbon electrodes built into such ends is then dug in the charge mixture, and it is filled with graphite or carbon which forms an electrical conducting path or core from one electrode to the other. The remaining space within the furnace is filled with coke, sand and sawdust mixture. The function of the sawdust in the mixture is to facilitate the escape of gases generated during the formation of the silicon carbid. Electric current is passed through the graphite or carbon core in the center of the furnace for a period of about thirty-six hours, thereby maintaining a temperature of over 1800° C. in the interior of the furnace, although the temperature may be in excess of 2200° C. At this temperature, the carbon of the coke and silica of the sand combine according to the following reactions, resulting in the formation of silicon carbid.

(1) $SiO_2 + 3C = SiC + 2CO$
(2) $SiO_2 + 2C = Si + 2CO$
(3) $Si + C = SiC$
(4) $3Si + 2CO = SiO_2 + 2SiC$

The ratio between the amount of silica and carbon in the mixture has to be maintained within relatively narrow limits, and generally, is substantially that represented by equation 1.

At the temperature inside the furnace, the silica and silicon exist as vapors and the carbon monoxid as a gas. The formation of silicon carbid is largely due to reactions between the gases and solids and gas and gas.

The usual method of charging a silicon carbid furnace is to use the same mixture throughout the furnace. I have discovered that this practice does not produce a uniform distribution of gases and results in the production of a non-uniform product. There is a circulation of gases throughout the furnace and the highly heated vapors of silicon and silica tend to rise. This results in a concentration of silicious compounds in the upper part of the furnace, and a deficiency of these compounds in the lower part. I have further discovered that the circulation and uniform distribution of these gases is of the utmost importance in the production of a uniform grade of silicon carbid throughout the furnace and that it is possible to obtain a practically uniform distribution and the production of a substantially uniform product by using in the lower part of the furnace or below the core a charge mixture having a higher silica carbon ratio than is used in the upper part of the furnace or above the core. By the term "below the core", I mean all space within the furnace lying below a horizontal plane which substantially bisects the core.

In the preferred method of carrying out my invention I use below the carbon or graphite core a mixture containing coke and sand in the following proportions:

111 parts coke containing 90% carbon
194.8 parts sand containing 99.5% silica
which is equivalent to:
100 parts carbon
194 parts silica.

Above the core I use a mixture containing:
111 parts coke containing 90% carbon
170.8 parts sand containing 99.5% silica
which is equivalent to
100 parts carbon
170 parts silica.

I have found that a difference of eight parts of silica to 100 parts of carbon in the mixture used above and below the core causes a noticeable improvement in the uniformity of the product, but that a difference of 20 to 40 parts of silica to 100 parts of carbon are necessary for the best results.

I do not limit myself to any particular method of placing the excess silica in the lower half of the furnace, as this may be varied. Further, it is not necessary that the excess silica be exactly distributed in the same proportion throughout the lower half of the furnace or that the deficiency exist in the same proportion throughout the upper half of the furnace. In fact, it might be possible to get the necessary excess of silica by making some portions of the lower half of the furnace very much richer in silica than I have indicated and using normal proportions in other portions. The appended claims are to be read with these considerations in view.

The practice of my invention results in the production of silicon carbid of a much more uniform character throughout the furnace than has heretofore been possible.

I claim:

1. In the manufacture of silicon carbid, the method which consists in forming a furnace charge containing carbon and silica and in which the silica-carbon ratio is higher in the lower than in the upper portion of the charge, and heating said mixture to the temperature of formation of silicon carbid by passing an electric current through a conducting core embedded in the charge, substantially as described.

2. In the manufacture of silicon carbid, the method which consists in forming a furnace charge containing coke and sand and in which the silica-carbon ratio is higher in the lower than in the upper portion of the charge, and heating said mixture to the temperature of formation of silicon carbid by passing an electric current through a conducting cord embedded in the charge, substantially as described.

3. The method of making silicon carbid which consists in heating to the temperature of formation of silicon carbid a mixture containing sand and coke by passing an electric current through a conducting core embedded in the mixture, the mixture below such core having a higher silica-carbon ratio than the mixture above the core, substantially as described.

4. In the manufacture of silicon carbid, the method which consists in forming a furnace charge containing a mixture of sand and coke and passing an electric current through a conducting core embedded in the mixture, the mixture below such core containing from eight to forty parts more silica to one hundred parts of carbon than the mixture above the core, substantially as described.

5. In the manufacture of silicon carbid, the method which consists in forming a furnace charge mixture containing coke and sand and in which certain portions of the mixture have a substantially predetermined higher silica-carbon ratio than other portions of the mixture, and passing an electric current through a conducting core embedded in the mixture to produce therein the temperature of formation of silicon carbid, substantially as described.

In testimony whereof, I have hereunto set my hand.

OTIS HUTCHINS.